(12) United States Patent
Zethoff et al.

(10) Patent No.: US 8,272,511 B2
(45) Date of Patent: Sep. 25, 2012

(54) PACKAGING AND DISPOSABLE ARTICLE DISPOSED THEREIN

(75) Inventors: Martin Zethoff, Kelkheim (DE); Philip Andrew Sawin, Wyoming, OH (US); Ravi K. Saggar, Blue Ash, OH (US); Matthew Aaron Neumann, Sharonville, OH (US); Edward John Milbrada, West Chester, OH (US); Ralf Niepelt, Gronau (DE); Luis Alberto Santini Torres, Barbera del Valles (ES)

(73) Assignee: The Procter & Gamble Company, Cincinnati, OH (US)

( * ) Notice: Subject to any disclaimer, the term of this patent is extended or adjusted under 35 U.S.C. 154(b) by 1645 days.

(21) Appl. No.: 11/253,503

(22) Filed: Oct. 19, 2005

(65) Prior Publication Data

US 2006/0113211 A1    Jun. 1, 2006

Related U.S. Application Data

(60) Provisional application No. 60/621,117, filed on Oct. 22, 2004.

(51) Int. Cl.
*B65D 85/84* (2006.01)
*B65D 73/00* (2006.01)

(52) U.S. Cl. ..................... 206/524.2; 206/494
(58) Field of Classification Search ................. None
See application file for complete search history.

(56) References Cited

U.S. PATENT DOCUMENTS

| | | | |
|---|---|---|---|
| 5,011,719 A * | 4/1991 | Gehrke et al. ......... | 428/35.7 |
| 5,049,449 A * | 9/1991 | Ofstein ............... | 428/476.1 |
| 5,446,100 A * | 8/1995 | Durrance et al. ....... | 525/221 |
| 5,620,694 A | 4/1997 | Girardot | |
| 5,744,149 A | 4/1998 | Girardot | |
| 5,972,361 A | 10/1999 | Fowler et al. | |
| 5,980,931 A | 11/1999 | Fowler et al. | |
| 6,063,397 A | 5/2000 | Fowler et al. | |
| 6,074,655 A | 6/2000 | Fowler et al. | |
| 6,132,746 A | 10/2000 | Hasenoehrl et al. | |
| 6,153,208 A | 11/2000 | Mcatee et al. | |
| 6,280,757 B1 | 8/2001 | Mcatee et al. | |
| 6,338,855 B1 | 1/2002 | Albacarys et al. | |
| 6,495,151 B2 | 12/2002 | Mcatee et al. | |
| 6,521,338 B1 | 2/2003 | Maka | |
| 6,620,474 B1 | 9/2003 | Regnier et al. | |
| 2005/0008680 A1 | 1/2005 | Deckner et al. | |
| 2005/0011906 A1 * | 1/2005 | Buck et al. ........... | 221/64 |
| 2005/0150784 A1 | 7/2005 | Sanchez et al. | |

OTHER PUBLICATIONS

PCT Notification of Transmittal of the International Search Report and the Written Opinion of the International Searching Authority, or the Declaration dated Mar. 29, 2006.

* cited by examiner

*Primary Examiner* — Shanon A Foley
(74) *Attorney, Agent, or Firm* — W. E. Gallagher

(57) ABSTRACT

An article of commerce includes a disposable cleaning article and a package. The package exhibits soft visual and sound characteristics. The package is formed as a multilayer packaging film including at least a co-extruded vapor barrier film layer and a polymeric film layer having a melting point at least about 20° C. less than the co-extruded film layer. The polymeric film layer is sealable to form the package so as to enclose the disposable cleaning article, thereby to substantially retain the water content of the disposable cleaning article. The polymeric film layer further exhibits a corrected sound level of less than approximately 50 decibels at readily audible frequencies, such as 3-5 kHz. The reduced sound level may be achieved by providing a film with a high loss tangent. In addition, the multilayer packaging film may have an outer surface with a soft or "matte" appearance.

20 Claims, 4 Drawing Sheets

PACKAGING AND DISPOSABLE ARTICLE DISPOSED THEREIN

CROSS REFERENCE TO RELATED APPLICATION

This application claims the benefit of U.S. Provisional Application No. 60/621,117, filed Oct. 22, 2004

FIELD OF THE INVENTION

The present disclosure generally relates to packaging for disposable articles and, more particularly, packaging for disposable cleaning articles having water content.

BACKGROUND OF THE INVENTION

Various types of materials are known for packaging disposable cleaning articles. Typically, the materials are plastic or plastic-based films, and may include one or more layers of polypropylene, polyethylene, or other polymeric materials. In many applications, the article to be sealed has a water content. Accordingly, it is known to provide a sealed package to substantially retain the water content, thereby lengthening the shelf-life of the packaged product.

While previous packages have adequately addressed the need to retain water content, other physical characteristics of the packaging may influence a consumer's purchase of a particular product. When the cleaning article and package are provided as an article of commerce, typically only the package is capable of being viewed or touched when displayed on a store shelf. Accordingly, the appearance, feel, auditory qualities, and other characteristics of a packaged article may distinguish it from other products having similar functions or uses.

The real or perceived physical attributes of a package may convey a desired perception regarding a quality of the article enclosed therein. For example, it is desirable for body cleansing wipes to be soft and gentle to the skin. Accordingly, it may be desirable for the packaging to also convey the quality of "softness." With regard to appearance, a matte, rather than glossy, finish is associated with the concept of softness. In addition, consumers are sensitive to the amount of sound generated during handling and use of the package. By providing a package that displays both a matte appearance and reduced noise characteristics, a consumer may perceive the package and its contents as having "soft" qualities, which may desirably distinguish it from other packaged products.

SUMMARY OF THE DISCLOSURE

Certain aspects of the present disclosure relate to an article of commerce having a disposable cleaning article with a water content and a package comprising a multilayer packaging film. In one embodiment, the multilayer packaging film includes at least a co-extruded vapor barrier film layer and a polymeric film layer. The polymeric film layer preferably has a melting point at least about 20° C. less than the co-extruded film layer, is laminated to the co-extruded polypropylene layer, and is sealable to form the package to enclose the disposable cleaning article. The multilayer packaging film substantially retains the water content of the disposable cleaning article and exhibits a corrected sound level of less than approximately 50 decibels at a sound level measurement frequency of approximately 3150 Hz.

According to other aspects of the disclosure, an article of commerce is provided having a disposable cleaning article with a water content and a package including a multilayer packaging film with at least a sealable layer to form the package so as to enclose the disposable cleaning article. The package has length and width dimensions and an outer surface. The multilayer packaging film on the outer surface has a reflectance of less than approximately 4 when illuminated at an incidence angle of 20° along directions parallel to each of the length dimension and the width dimension and less than approximately 30 when illuminated at an incidence angle of 60° along directions parallel to each of the length dimension and the width dimension. In addition, the package exhibits a corrected sound level of less than approximately 50 decibels at a sound level measurement frequency of approximately 3150 Hz.

Still further, the present disclosure relates to an article of commerce including a disposable cleaning article having a water content and a package comprising a multilayer packaging film. The multilayer packaging film has a co-extruded film layer comprising polypropylene and a polymeric film layer having a melting point at least about 20° C. less than the co-extruded film layer laminated to the co-extruded polypropylene layer. The polymeric film is sealable to form the package so as to enclose the disposable cleaning article. The package has length and width dimensions and an outer surface wherein the multilayer packaging film on the outer surface has a reflectance of less than approximately 4 when illuminated at an incidence angle of 20° along directions parallel to each of the length dimension and the width dimension and less than approximately 30 when illuminated at an incidence angle of 60° along directions parallel to each of the length dimension and the width dimension. The multilayer packaging film also substantially retains the water content of the disposable cleaning article and exhibits a corrected sound level of less than approximately 50 decibels at a sound level measurement frequency of approximately 3150 Hz.

According to an additional aspect of the disclosure, an article of commerce is provided having a disposable cleaning article with a water content and a package comprising a multilayer packaging film. The multilayer packaging film includes at least a co-extruded vapor barrier film layer and a polymeric film layer having a melting point at least about 20° C. less than the co-extruded film layer laminated to the co-extruded film layer. The polymeric film layer is sealable to form the package so as to enclose the disposable cleaning article, thereby substantially retaining the water content of the disposable cleaning article. The polymeric film layer further exhibits a loss tangent greater than about 0.1 when subjected to sinusoidal oscillation in a frequency range less than 40 Hz.

These and other aspects of the disclosure are described more fully below in the Detailed Description taken in conjunction with the accompanying drawings.

DETAILED DESCRIPTION

Various embodiments of an article of commerce having a disposable cleaning article enclosed in a multilayer packaging film are disclosed herein. Materials used to form the multilayer packaging film are selected so that the assembled article of commerce displays the quality, or otherwise conveys the impression, of softness. In particular, the packaging of the article of commerce may have a matte finish and may be formed of materials that exhibit reduced sound levels across a readily audible range of sound frequencies when the article of commerce is handled or manipulated.

Figure 1:
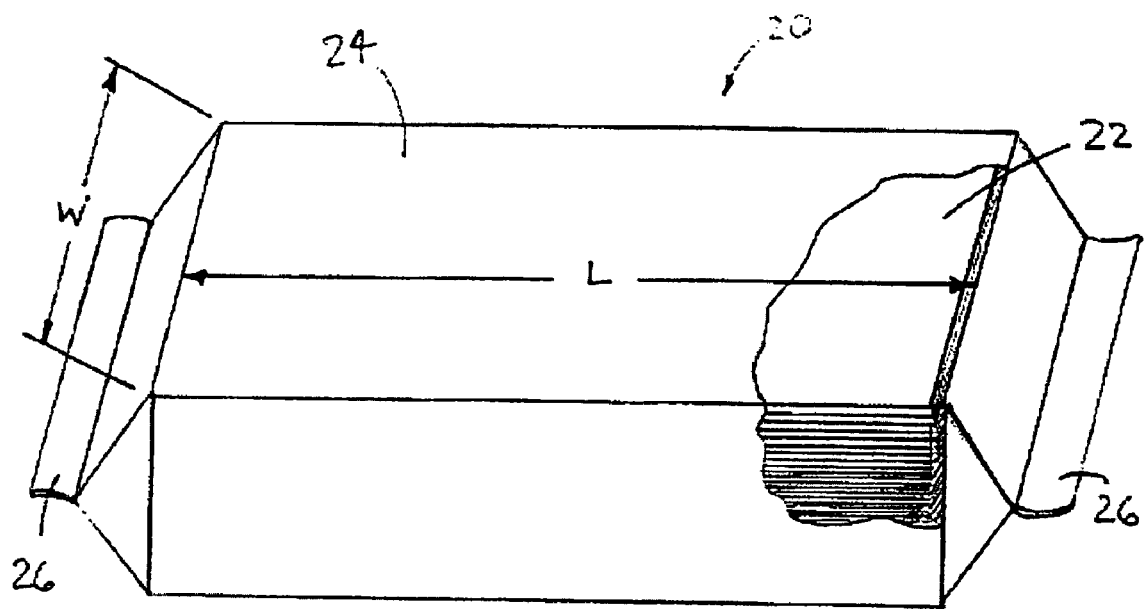
FIG. 1 is a perspective view of a packaging containing a plurality of disposable cleaning articles in accordance with the present disclosure.

Referring to FIG. 1, an article of commerce in accordance with the present disclosure is identified by reference numeral 20. The article of commerce includes a plurality of disposable cleaning articles 22 enclosed within a package 24. In the illustrated embodiment, the package 24 is formed from a sheet of packaging film that is wrapped around the plurality of disposable cleaning articles 22. Adjacent ends of the packaging film are sealed together to completely enclose the cleaning articles 22. Accordingly, a rear seal (not shown) extends along a length L of the package 24 and two side seams 26 extend across a lateral width W of the package 24. As illustrated in the cut away portion of FIG. 1, the disposable cleaning articles 22 may be in the form of generally planar sheets that are stacked. In alternative embodiments, the package 24 may enclose a single disposable cleaning article 22, or the one or more disposable cleaning articles 22 may be provided in any known shape other than the planar sheets illustrated in FIG. 1. For example, the sheets comprising cleaning articles 22 may be folded along an edge and the folded portions engaged to facilitate removal of an individual sheet from package 24.

The disposable cleaning article 22 may include one or more compositions disposed on a substrate. For example, the cleaning article may be provided as a wet wipe, defined herein as a substrate material having a cleaning composition disposed thereon that is used to cleanse body parts. While the material is typically non-woven and made of synthetic compounds, woven materials as well as natural compounds, either woven or non-woven, may also be used. The substrate material is impregnated with a liquid or semi-liquid composition that may enhance cleaning, provide a smooth feeling, or perform some other function. The composition may include an emollient, a surfactant, an emulsifier, a soothing agent, a rheology modifier, a preservative or preservative system, water, or other component. For examples of each component and additional details regarding substrates and compositions for wet wipes, please see U.S. patent application Ser. No. 10/878,875, filed on Jul. 9, 2004, and entitled "A Composition for Wet Wipes that Enhances the Efficacy of Cleansing While Being Gentle to the Skin" assigned to the same assignee as the present disclosure, the disclosure of which is incorporated herein by reference. Such wet wipes may have a water content of 50% or more by weight.

Alternatively, the disposable cleaning article 22 may be provided as a primarily "dry" product. For example, a child cleansing mitt may be provided, such as one of those disclosed in U.S. patent application Ser. No. 10/948,034, entitled "Child's Cleansing System", filed on Mar. 10, 2004, assigned to the same assignee as the present disclosure, the disclosure of which is also incorporated herein by reference. Accordingly, the cleaning article 22 may include a cleaning implement formed in the shape of a mitt and carrying a personal care composition. The mitt may be formed of natural fibers, synthetic fibers, or a combination thereof. Suitable natural fibers include, but are not limited to, cellulosic fibers such as wood pulp fibers, cotton, and rayon. Suitable synthetic fibers include fibers commonly used in textiles including, but not limited to, polyester and polypropylene fibers, polyethylene, polyether, PET, and combinations thereof. The personal care composition may be provided in the form of a paste or dry solid. While such "dry" compositions have a water content, it is typically no more than 10% by weight. Personal care compositions may include a surfactant and one or more adjunct ingredients, as disclosed in greater detail in the '034 application. Other similar "dry" products are disclosed in U.S. Pat. Nos. 5,620,694; 5,744,149; 5,972,361; 5,980,931; 6,063,397; 6,074,655; 6,132,746; 6,153,208; 6,280,757; 6,338,855; and 6,495,151.

As understood from the foregoing, the disposable cleaning article 22 has a water content. The article 22 may be relatively dry (i.e., having a water content of less than 10%) or relatively wet (i.e., having a water content of 50% or more). While two examples are provided above, various alternative forms of the disposable cleaning article 22 may be used in accordance with the present disclosure that may have other water content values.

The package 24 includes material selected to achieve various characteristics. For example, the package 24 is preferably sealable and has a water vapor transmission rate of less than approximately 5 g/m²/day, thereby to increase shelf life of the disposable cleaning article 22. In addition, the package 24 preferably has an exterior surface exhibiting a "soft" or matte finish. Still further, the package material exhibits reduced sound characteristics when handled or manipulated, thereby contributing to the perception of softness.

Figure 2:
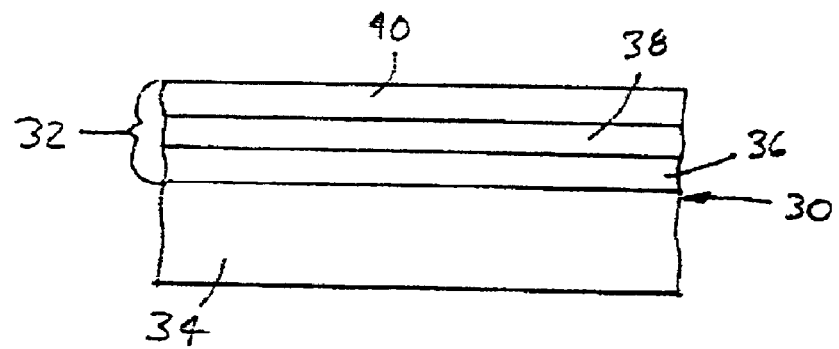
FIG. 2 is an enlarged side elevation view, in cross-section, of a packaging film in accordance with the present disclosure.

A multi layer packaging film has been identified that exhibits all the desired characteristics. As best illustrated in FIG. 2, the multi layer packaging film 30 includes a co-extruded film layer 32 laminated to a polymeric film layer 34. In the illustrated embodiment, the co-extruded layer 32 includes an inner ply 36, central ply 38, and outer ply 40. Each ply 36, 38, 40 of the co-extruded film layer 32 comprises a thermoplastic material, such as polypropylene. The outer ply 40 may include an appearance modification additive to impart a matte finish. Suitable appearance modification additives include but are not limited to calcium carbonate ($CaCO_3$—including "calcite"), talc, China clay (including "kaolinite"), calcined clay (including "defect spinel"), aluminum trihydrate (including "gibbsite"), magnesium hydroxides (including "brucite"), wollastonite, mica (including "muscovite" and "phlogopite"), silica (including "quartz" and "amorphous"), carbon black, synthetic silica (including "precipitated" and "fumed"), aluminum hydroxides, magnesium carbonate, antimony oxides, precipitated calcium carbonate, and colorants such as $TiO_2$ and inorganics, with $CaCO_3$ being preferred. The polymeric film layer 34 is preferably formed of a material capable of sealing with itself, such as by heat-sealing. Where the polymeric film layer 34 is to heat-sealed, it is preferable that the polymeric film layer material has a melting point at least approximately 20° C., less than a melting of the co-extruded film layer material. Furthermore, the co-extruded film layer 32 and polymeric film layer 34 need not be formed of the same material. For example, the co-extruded film layer 32 may be formed of polypropylene and the polymeric film layer 34 may be formed of polyethylene.

At least one of the layers used in the multilayer packaging film 30 provides a vapor barrier for substantially retaining the water content of the disposable cleaning article enclosed therein. The multi layer packaging film 30 preferably has a water vapor transmission rate of less than approximately 5 g/m²/day. Furthermore, the co-extruded film layer 32 preferably has an overall thickness of approximately 20 microns when formed with three plies 36, 38, 40 of polypropylene, while the polymeric film layer 34, when provided as polyethylene, preferably has a thickness of approximately 40 microns. Accordingly, in the currently preferred embodiment, the multi layer packaging film 30 has an overall thickness of less than about 100 microns, preferably less than about 75 microns, more preferably less than about 70 microns. In a particularly preferred embodiment multi layer packaging film 30 has an overall thickness of about 60 microns. It will be appreciated that the specific layers of the multi layer packaging film 30 may have different thicknesses and may be provided in different materials.

Material for the outer surface of the multi layer packaging film should be selected to provide a low gloss or matte finish. Specular gloss data was obtained for the currently preferred embodiment of the multi layer packaging film 30 and various prior art films to identify a desired range of reflectances for the outer surface. Specifically, specular gloss values for the various films were determined using ASTM standard test method D-2457-03. This method was used to obtain gloss values for plastic films in the machine direction (MD) and cross direction (CD) for both a 20° and a 60° illumination/view angle. Plastic films are typically processed in web form, and the machine direction is generally understood to indicate the direction in which the web travels during processing while the cross direction is perpendicular to the machine direction and therefore extends laterally across the web. In the finished product, the package 24 will have a length corresponding to one of the machine and cross directions and a width corresponding to the other of the machine and cross directions.

During reflectance testing, a micro-tri-gloss 20/60/80 gloss meter, marketed by BYK-Gardner USA (model 4520, Serial No. 978711), was used to obtain data operating under the automatic dark end gloss calibration against glass standard. The films tested using this procedure and equipment were the currently preferred embodiment (i.e., a three-ply co-extrusion of polypropylene having an overall thickness of 20 microns laminated to a 40 micron thick layer of polyethylene), and films used as packaging materials for commercially available wet wipes including those from Procter & Gamble (Pampers® Baby Wipes). For each film, specular gloss values were recorded three times in the machine direction and three times in the cross direction for both the 20 and 60 degree illuminations/viewing angles. The following table summarized the mean specular gloss values measured in the unprinted white region of each film:

TABLE 1

| SPECULAR GLOSS DATA | | | | |
|---|---|---|---|---|
| FILM SAMPLE | MD-20 | CD-20 | MD-60 | CD-60 |
| Commercial Wipe Product 1 | 1.3 | 1.3 | 5.7 | 5.6 |
| Commercial Wipe Product 2 | 1.0 | N/A | 3.5 | N/A |
| Commercial Wipe Product 3 | 2.5 | 1.9 | 14.5 | 13.7 |
| Commercial Wipe Product 4 | 3.7 | 3.9 | 19.5 | 20.6 |
| Commercial Wipe Product 5 | 1.4 | 1.4 | 5.4 | 5.2 |
| Pampers® Baby Wipes | 33 | 28 | 80 | 82 |

TABLE 1-continued

| SPECULAR GLOSS DATA | | | | |
|---|---|---|---|---|
| FILM SAMPLE | MD-20 | CD-20 | MD-60 | CD-60 |
| Currently Preferred Embodiment | 3 | 3 | 27 | 26 |

Accordingly, it will be seen that the current embodiment exhibits a specular gloss value of less than approximately 4 when illuminated at an incidence angle of 20° along a direction parallel to each of the machine end cross directions and specular gloss values of the less than approximately 30 when illuminated at an incidence angle of 60° along directions parallel to each of the machine and cross directions. Films having specular gloss values within this range provide a sufficient matte finish to suggest the concept of softness to the consumer.

The multi layer packaging film 30 should also exhibit reduced noise characteristics when handled or manipulated to further reinforce the concept of softness to the consumer. While a human is typically sensitive to noises across the audible spectrum of 20 Hz to 20 kHz, there is a narrower band frequencies within this range to which the human is more sensitive. This readily audible range of frequencies is roughly 2 to 5 kHz. Sound generated at this narrower band of frequencies is audible at lower magnitudes, such as 10 decibels, whereas sound generated at frequencies outside this range may not be audible until its magnitude is 60 or more decibels.

The same films used in the gloss data testing were also analyzed to determine noise levels.

TABLE 2

| SOUND LEVEL DATA | | | |
|---|---|---|---|
| FILM SAMPLE | 5000 Hz | 4000 Hz | 3150 Hz |
| Commercial Wipe Product 1 | 48.0 dB | 53.3 dB | 51.0 dB |
| Commercial Wipe Product 2 | 49.5 dB | 47.9 dB | 51.3 dB |
| Commercial Wipe Product 3 | 42.9 dB | 46.6 dB | 53.5 dB |
| Commercial Wipe Product 4 | 54.8 dB | 55.3 dB | 58.0 dB |
| Commercial Wipe Product 5 | 55.6 dB | 56.2 dB | 54.6 dB |
| Pampers® Baby Wipes | 51.7 dB | 51.8 dB | 54.0 dB |
| Currently Preferred Embodiment | 40.9 dB | 46.6 dB | 48.4 dB |

As can be seen from Table 2, the currently preferred embodiment of the multi-layer packaging film 30 exhibits lower noise levels than any other films at frequencies tested within the readily audible range. Specifically, the currently preferred embodiment of the multi layer packaging film 30 was the only sample to generate less than 50 decibels at the 3150, 4,000, and 5,000 Hz frequencies. It was also the only sample to generate less than 50 decibels at a frequency of 3150 Hz. This lower noise characteristic is desirable to create the perception of softness with the consumer.

Figure 6:
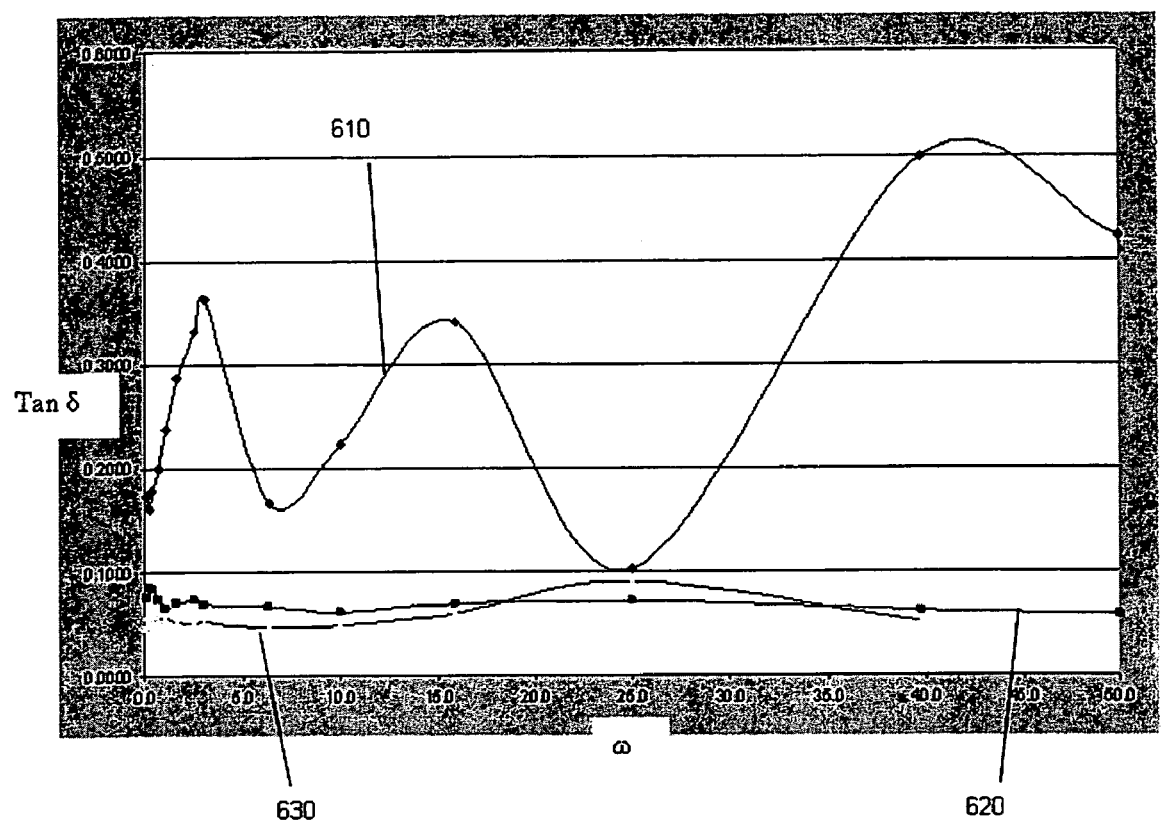
FIG. 6 is a graph of observed loss tangent vs. frequency for two packaging films.

Applicants believe that the lower sound levels generated by the multi layer packaging film 30 are at least in part attributable to the structural characteristics of the film. During dynamic mechanical analysis, the loss tangent (Loss tangent—i.e. tan δ—is a well known characteristic of viscoelastic materials and is defined as the ratio of the loss modulus to the storage modulus) of the currently preferred multi layered packaging film and the previous Procter & Gamble film were compared. The "loss tangent" is a measure of energy dissipation, usually by heat, by a viscoelastic material. FIG. 6 charts the loss tangent of the currently preferred film and the previous Procter & Gamble film with respect to frequency. A higher loss tangent corresponds to increased energy dissipation by heat. Otherwise, such energy would be converted to mechanical energy, including the vibration perceived as noise. Suitably, tan δ is greater than about 0.1 when measured at frequencies less than about 15 Hz, preferably greater than about 0.13, more preferably greater than about 0.15.

As illustrated by the graph provided at FIG. 6, the loss tangent of the currently preferred film 610, when observed at frequencies below about 40 Hz, is greater than the loss tangent of the previous Procter & Gamble film 620 or the film used to package Commercial Wipe Product 3 (prior art film having the lowest sound level in Table 2). As shown in the graph, the currently preferred film 610 has loss tangent values greater than approximately 0.1000 across the spectrum of tested frequencies, which was 0-50 Hz. Conversely, the previous Procter & Gamble film 620 and the film used for Commercial Wipe Product 3 had loss tangents less than approximately 0.1000 across the same range of frequencies. Normal manipulation and handling of the package 24 occurs at these lower frequencies, and therefore it would be appear that the greater loss tangent of the current film at least in part explains the lower sound levels generated by the current film. Without being bound by theory, it is believed that the higher loss tangent at these lower frequencies means that more of the mechanical energy applied to a package by manual manipulation thereof is dissipated as heat instead of being dissipated by mechanically induced vibration of the film comprising the package which is believed to be the underlying source of any noise generated as a result of the manipulation.

Test Methods

Water Vapor Transmission Rate

Water Vapor Transmission Rate (WVTR) may be suitably measured according to American Society for Testing and Materials Standard Method ASTM F 1249 entitled "Test Method for Water Vapor Transmission Rate Trough Plastic Film and Sheeting Using a Modulated Infrared Sensor." This method is known to those of skill in the art for measuring the permeability of a film by placing a gas with a known temperature and water content on a first or "wet" side of the film and measuring water content on the opposite side of the film. The WVTR values used herein were obtained using a gas on the wet side having ~90% relative humidity and a temperature of ~38° C.

Sound Level Measurement

Figure 3:
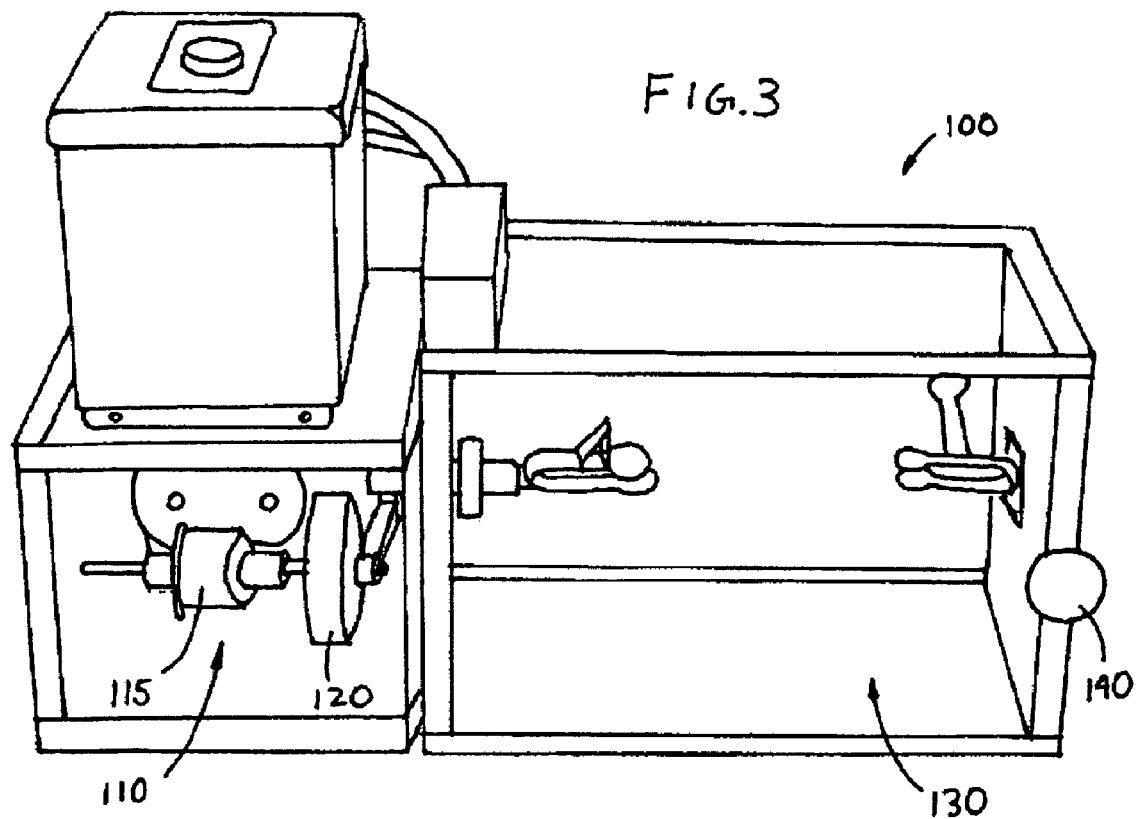
FIG. 3 is a front perspective view of apparatus used to measure sound levels generated by packaging film samples.
Figure 4:
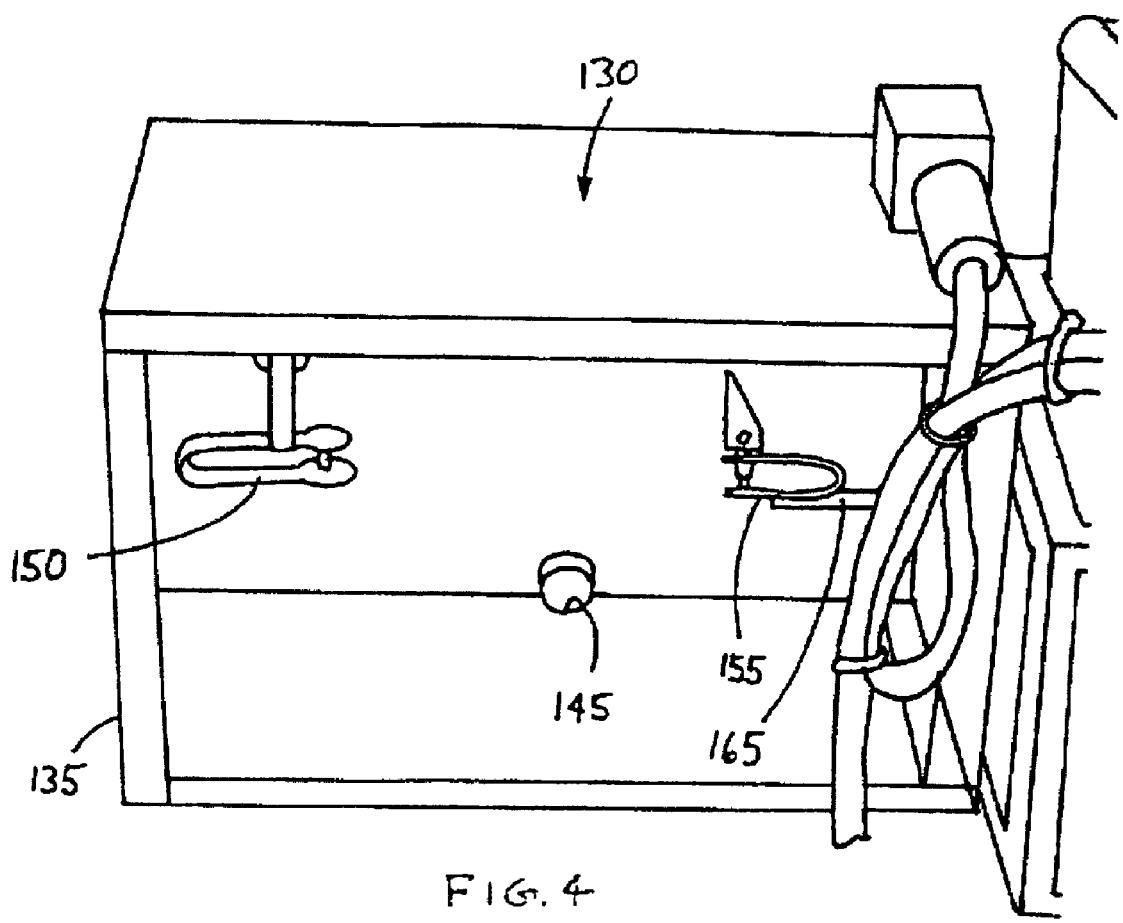
FIG. 4 is a rear perspective view of a sound measurement chamber used in the apparatus of FIG. 3.
Figure 5:
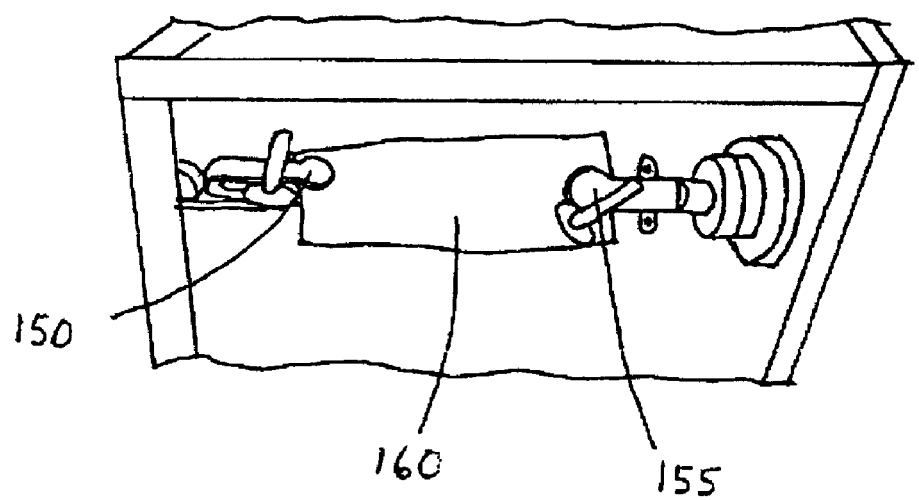
FIG. 5 is an enlarged front perspective view of the chamber of FIG. 4 with a package film sample clamped therein.

The testing method used is suitable for measuring noise generated by controlled flexing of a sample taken from a web-like structure (e.g., a film or a non-woven material). An audio measuring device, such as the Audio Tool Box™ marketed by TerraSonde of Bolder, Colo., may be used for measuring sound levels. A suitable sample flexing device 100 is shown in FIGS. 3-5. As seen most clearly in FIG. 3, the device includes a noise measurement chamber 130 and a drive mechanism 110. The drive mechanism 110 is designed to cyclically flex the sample through an angular displacement of 90 degrees at a frequency of 44 cycles/minute. As shown in FIGS. 3 and 4, the drive mechanism 110 comprises an electric motor 115 and a gear train 120 (which includes a crank mechanism and suitable gearing so as to convert the rotary motion of motor 115 to an oscillating motion) that are integrated to deliver the requisite angular displacement and frequency.

FIG. 4 shows the noise measurement chamber 130 in more detail. As can be seen therein, the chamber 130 comprises a rectangular box 135 that is provided with access means 140 (FIG. 3) to allow sample insertion and removal. The box 135 is made from LEXAN (1.27 cm thick) and has interior dimensions of 22.9 cm×15.2 cm×12.7 cm (length. width, depth). The box 135 is also provided with sensor orifice 145 (diameter=1.27 cm) for inserting the sensor from the audio measuring device. Inside the box 135 is a sample holding apparatus which comprises a fixed clamp 150 and an opposed, rotatable clamp 155 which is connected to the gear train 120 by shaft 165. The fixed clamp 150 is attached to the end of the box 135 that is opposite to the drive mechanism 110. The axes of clamps 150 and 155 are horizontally and vertically aligned. The leading edges of clamps 150, 155 are separated by a distance of approximately 10 cm. As seen more clearly in FIG. 5, the clamps 150 and 155 have a circular configuration (with a diameter of approximately 18 mm) for gripping the sample 160.

The sample 160 may be prepared using a template and an appropriate cutting device (i.e., scissors or utility knife) to cut rectangular samples from the material to be tested. For the testing described herein, rectangular samples measuring approximately 50.8 mm×127 mm were cut. Enough samples of each film were cut to run at least 3 tests for each.

The audio measurement device was set-up according to the manufacturer's instructions. Specifically, the "Acoustic Analysis, Real Time Analyzer" mode was used with the following settings:

Function: RTA (Real Time Analyzer)
Submenu: Full (20 Hz-20 KHz)
Octave-Band: 3 (⅓ Octave Band)
Averaging: 1 s (1 second)
Input: MicL (Low Range Microphone Input: 30-95 dB)
Display dB Range: 72-55
Pink Noise Generator: Off
Memory: Initial dB Settings Set-up of the sample flexing device included confirming that the drive mechanism 110 was operating at a frequency of 44 cycles per minute and that the angular displacement during operation was approximately 90 degrees. In addition, the orientation of the clamps 150, 155 was checked to confirm that their open faces were angularly aligned within ±15 degrees.

For each sample, an ambient sound level was measured to allow the sample sound measurement to be compensated for noise generated by the drive mechanism 110. The ambient sound level may be measured prior to or after evaluation of samples at each frequency of interest. To obtain an ambient sound level, the motor 115 was started and the probe from the audio measurement device was inserted into sensor orifice 145. The distance from the end of the probe to the centerline of the sample was measured and, if necessary, adjusted to be approximately 63.5 mm. The audio measurement device was then set to the first frequency at which sound level was to be measured. After a 5 second stabilization period, the highest decibel reading observed over the next 5 seconds was recorded. The ambient noise measurements were identified by the variable "$AS_{fi}$", where f is the frequency and i is the replicate number. The foregoing was repeated to obtain three decibel measurements. The motor 115 was then turned off, and the audio measurement device was set to the next frequency for sound level measurement. This was repeated until sound level measurements were obtained at the desired frequencies, namely 5000 Hz, 4000 Hz, and 3150 Hz.

To measure the noise level of each sample, first the access means 140 and clamps 150, 155 were opened. A sample was placed on one of the clamps 150, 155 so that it was approximately centered between the clamps, and the clamp was closed. The sample was placed under a slight tension, such as approximately 10N, while the other end of the sample was placed in the remaining open clamp, and the remaining clamp was closed. The sample was then visually inspected to ensure that the long edges of the sample were parallel to the axis of clamps 150, 155. In addition, the sample was inspected to ensure that there was less than 15 degrees of skew between the clamps. If not, the position of rotatable clamp 155 was manually rotated. With the sample properly oriented, the access means 140 was closed and the motor 115 was started. The probe of the audio measurement device was inserted into the sensor orifice 145, and the position of the probe was adjusted as needed to obtain a distance from the end of the probe to the centerline of the sample of approximately 63.5 mm. The audio measurement device was set to the first frequency for sound level measurement. After a 5 second stabilization period, the highest decibel reading observed over the next 5 seconds was recorded. The sample sound level measurements are identified as "$S_j S_{fi}$", where j is a material identifier, f is the frequency and i is the replicate number. The foregoing was repeated to obtain sound level measurements for the sample at the other desired frequencies, namely 5000 Hz, 4000 Hz, and 3150 Hz. This process was also repeated for each sample, to obtain a full set of data.

The sound data was then used in well-known algorithms to obtain more meaningful information regarding the sound characteristics of the sample films. First, an average sound level for each frequency was calculated for both ambient sound and sample sound using the formula:

$$S_j S_{fAvg} = (10 \log(\Sigma 10^{(S_j S_{fi}/10)})/n \text{ or } AS_{fAvg} = (10 \log(\Sigma 10^{(AS_{fi}/10)})/n$$

The average sound level for a sample, corrected for the average ambient sound, for each frequency was then calculated using the formula:

$$C_j S_f = 10(\log 10^{(S_j S_{fAvg}/10)} - 10^{(AS_{fAvg}/10)}).$$

Dynamic Mechanical Analysis

Loss tangent is measured using Dynamic Mechanical Analysis (DMA) techniques. In such experiments a sample of a material is exposed to a sinusoidal strain having a predefined frequency (Hz) and the response to that strain is determined. The data may be analyzed to determine the storage modulus (G'), the loss modulus (G") and the loss tangent (tan δ=G"/G'). In one variation of the DMA test the frequency of the sinusoidal strain is varied over a predefined range and G', G" and δ are determined for each frequency.

DMA may be performed using a dynamic mechanical analyzer such as a TA Instruments DMA 2980 (hereinafter "DMA 2980"), available from TA Instruments, Inc., of New Castle, Del., equipped with a film clamp, Thermal Advantage/Thermal Solutions software for data acquisition, and Universal Analysis 2000 software for data analysis. Many other types of DMA devices exist, and the use of dynamic mechanical analysis is well known to those skilled in the art of polymer and copolymer characterization. Methods of operation, calibration and guidelines for using the DMA 2980 are found in TA Instruments DMA 2980 Operator's Manual issued March 2002, Thermal Advantage User's Reference Guide issued July 2000 and Universal Analysis 2000 guide issued February 2003. To those skilled in the use of the DMA 2980, the following operational run conditions should be sufficient to replicate the stretch and recovery of the samples.

The instrument should be set up according to the manufacturer's instructions. For purposes of evaluating films according to the present invention the following set up conditions should be used with this instrument:

| | |
|---|---|
| Oscillation Amplitude | 15 μm |
| Static Force | 0.1 N |
| Auto Tension | 130% |
| Frequency Range | 0-50 Hz |
| Sampling | 5 sec/pt |
| Five Points per Decade | |
| Log Mode | |
| Multi-Frequency Mode | |
| Method | Frequency Sweep Isothermal |

Once the experimental conditions are selected on the DMA 2980, the film clamp is mounted onto the DMA 2980 and calibrated according to the User's Reference Guide. The material to be tested is cut into samples of substantially uniform dimension. Appropriate sample dimensions may be selected to achieve the required strain. For the DMA 2980, suitable sample dimensions are approximately 6.4 mm wide by 30 mm long. The floating film clamp of the DMA 2980 is adjusted to a position which provides approximately 6 mm between the clamping surfaces, and is locked in this position. The sample is mounted in the film clamps and the lower clamp is allowed to float to allow determination of the actual gauge length which exists between the film clamps. The sample ID and dimensions are then recorded. Once testing is initiated, DMA data is obtained and recorded. The DMA is performed at 22° C.

For each sample tested report G' and G". Use the measured values for G' and G" to calculate tan δ (=G"/G') which is also reported.

All documents cited in the Detailed Description are, in relevant part, incorporated herein by reference; the citation of any document is not to be construed as an admission that it is prior art with respect to the present disclosure.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this disclosure.

What is claimed is:

1. An article of commerce comprising:
a disposable cleaning article having a water content; and
a package comprising a multilayer packaging film including at least:
   a co-extruded vapor barrier film layer; and
   a polymeric film layer comprising polyethylene having a melting point at least about 20° C. less than the co-extruded film layer, laminated to the co-extruded film layer;
wherein the polymeric film layer is sealable to form the package so as to enclose the disposable cleaning article, the multilayer packaging film substantially retaining the water content of the disposable cleaning article and exhibiting a corrected sound level of less than approximately 50 decibels at a sound level measurement frequency of approximately 3150 Hz measured according to the Sound Level Measurement testing method, and wherein the multilayer packaging film exhibits a loss tangent greater than 0.1000 across a spectrum of frequencies 0-50 Hz.

2. The article of claim 1, in which the multilayer packaging film further exhibits a corrected sound level of less than approximately 50 decibels at sound level measurement frequencies of approximately 4000 and approximately 5000 Hz.

3. The article of claim 1, in which the package has length and width dimensions and an outer surface wherein the multilayer packaging film on the outer surface has a reflectance of less than approximately 4 when illuminated at an incidence angle of 20° along directions parallel to each of the length dimension and the width dimension and less than approximately 30 when illuminated at an incidence angle of 60° along directions parallel to each of the length dimension and the width dimension.

4. The article of claim 3, in which the package outer surface is defined by an outer layer of the co-extruded polypropylene having an appearance modification additive.

5. The article of claim 4 wherein the appearance modification additive is $CaCO_3$.

6. The article of claim 4, in which the co-extruded film layer further includes central and inner plies of polypropylene, wherein the inner ply of the co-extruded polypropylene has a higher stiffness than the central and outer layers of the co-extruded polypropylene.

7. The article of claim 1, in which the multilayer packaging film has a water vapor transmission rate of less than approximately 5 g/m$^2$/day.

8. The article of claim 1, in which the multilayer packaging film has a thickness of less than about 70 microns.

9. The article of claim 1, in which the disposable cleaning article comprises a wet wipe.

10. The article of claim 1, in which the disposable cleaning article comprises a cleaning implement having a moisture-containing surfactant system disposed on a substrate.

11. An article of commerce comprising:
a disposable cleaning article having a water content; and
a package comprising a multilayer packaging film including at least a sealable first layer comprising polyethylene and a co-extruded vapor barrier film second layer to form the package so as to enclose the disposable cleaning article, the sealable first layer having a melting point at least about 20° C. less than the barrier film second layer, the package having length and width dimensions and an outer surface wherein the multilayer packaging film on the outer surface has a reflectance of less than approximately 4 when illuminated at an incidence angle of 20° along directions parallel to each of the length dimension and the width dimension and less than approximately 30 when illuminated at an incidence angle of 60° along directions parallel to each of the length dimension and the width dimension, wherein the package exhibits a corrected sound level of less than approximately 50 decibels at a sound level measurement frequency of approximately 3150 Hz measured according to the Sound Level Measurement testing method, and wherein the multilayer packaging film exhibits a loss tangent greater than 0.1000 across a spectrum of frequencies 0-50 Hz.

12. The article of claim 11, in which the multilayer packaging film further exhibits a corrected sound level of less than approximately 50 decibels at sound level measurement frequencies of approximately 4000 and approximately 5000 Hz.

13. The article of claim 11, in which the multilayer packaging film has a water vapor transmission rate of less than approximately 5 g/m$^2$/day.

14. The article of claim 11, in which the disposable cleaning article comprises a wet wipe.

15. An article of commerce comprising:
a disposable cleaning article having a water content; and
a package comprising a multilayer packaging film including at least:
a co-extruded film layer comprising polypropylene; and
a polymeric film layer comprising polyethylene having a melting point at least about 20° C. less than the co-extruded film layer, laminated to the co-extruded polypropylene layer;
wherein the polymeric film is sealable to form the package so as to enclose the disposable cleaning article;
wherein the package has length and width dimensions and an outer surface wherein the multilayer packaging film on the outer surface has a reflectance of less than approximately 4 when illuminated at an incidence angle of 20° along directions parallel to each of the length dimension and the width dimension and less than approximately 30 when illuminated at an incidence angle of 60° along directions parallel to each of the length dimension and the width dimension;
wherein the multilayer packaging film substantially retains the water content of the disposable cleaning article;
wherein the multilayer packaging film exhibits a corrected sound level of less than approximately 50 decibels at a sound level measurement frequency of approximately 3150 Hz measured according to the Sound Level Measurement testing method; and
wherein the multilayer packaging film exhibits a loss tangent greater than 0.1000 across a spectrum of frequencies 0-50 Hz.

16. The article of claim 15, in which the multilayer packaging film further exhibits a corrected sound level of less than approximately 50 decibels at sound level measurement frequencies of approximately 4000 and approximately 5000 Hz.

17. The article of claim 15, in which the package outer surface is defined by an outer layer of the co-extruded polypropylene having a $CaCO_3$.

18. The article of claim 15, in which the multilayer packaging film has a water vapor transmission rate of less than approximately 5 g/m$^2$/day.

19. The article of claim 15, in which the disposable cleaning article comprises a wet wipe.

20. An article of commerce comprising:
a disposable cleaning article having a water content; and
a package comprising a multilayer packaging film including at least:
a co-extruded vapor barrier film layer; and
a polymeric film layer comprising polyethylene having a melting point at least about 20° C. less than the co-extruded film layer, laminated to the co-extruded film layer;
wherein the polymeric film layer is sealable to form the package so as to enclose the disposable cleaning article, the multilayer packaging film substantially retaining the water content of the disposable cleaning article and exhibiting a loss tangent greater than about 0.1 when subjected to sinusoidal oscillation in a frequency range less than 15 Hz determined by Dynamic Mechanical Analysis of said multilayer packaging film.

* * * * *